United States Patent [19]
Weatherly et al.

[11] 3,892,828
[45] July 1, 1975

[54] METHOD OF MAKING PLASTIC ARTICLES HAVING EASILY SEVERABLE FLASH

[75] Inventors: Arden R. Weatherly, Downers Grove; Carson F. Buckman, Park Forest, both of Ill.

[73] Assignee: Continental Can Company, Inc., New York, N.Y.

[22] Filed: June 7, 1973

[21] Appl. No.: 367,998

[52] U.S. Cl. ............... 264/89; 264/99; 264/161; 264/173; 425/DIG. 212; 425/DIG. 234; 425/806
[51] Int. Cl. ..... B29c 17/07; B29c 17/12; B29d 9/00
[58] Field of Search ......... 264/98, 99, 161, 173, 89, 264/94, 96, 45–47, 163, 320–322; 425/326 B, 387 B, DIG. 212, DIG. 214, DIG. 234, DIG. 302 B, 296, 806

[56] References Cited
UNITED STATES PATENTS

| | | | |
|---|---|---|---|
| 2,750,625 | 6/1956 | Colombo | 18/5 |
| 3,140,004 | 7/1964 | Schaich | 215/1 |
| 3,444,285 | 5/1969 | Mason | 264/161 |
| 3,509,596 | 5/1970 | Shaw et al. | 264/99 |
| 3,576,707 | 4/1971 | Schrenk et al. | 161/164 |

OTHER PUBLICATIONS
Modern Plastics Encyclopedia 1967, September 1966/Vol. 44, No. 1A, pp. 460–461, (McGraw Hill, New York, N.Y.)

*Primary Examiner*—Jan H. Silbaugh
*Attorney, Agent, or Firm*—John J. Kowalik; Joseph E. Kerwin; William A. Dittmann

[57] ABSTRACT

A method of making an article which comprises introducing a parison laminate having a high strength inner lamina and a low strength outer lamina into an open mold and closing the mold to enclose the laminate and pinching the laminate at the parting areas of the mold sufficiently to squeeze out the high strength lamina leaving a flash-connecting, easily severable, low strength lamina and producing an article having a high gloss exterior with a tough and strong body portion. Either lamina may incorporate a coloring pigment.

9 Claims, 5 Drawing Figures

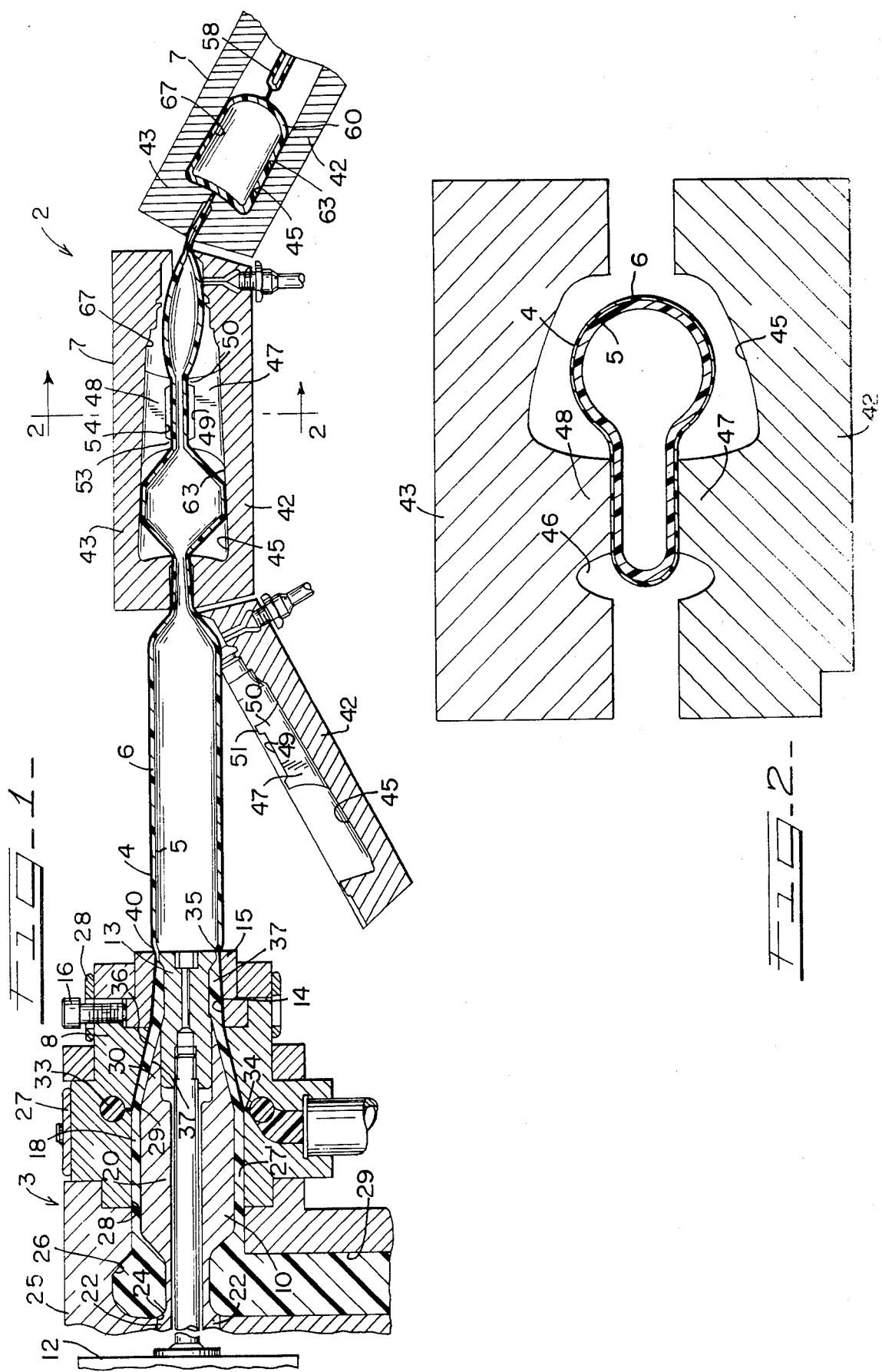

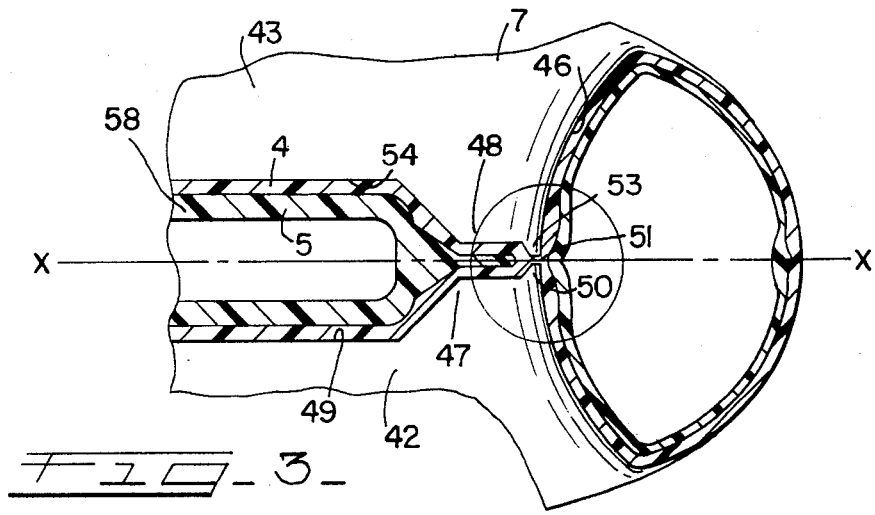
FIG_3_
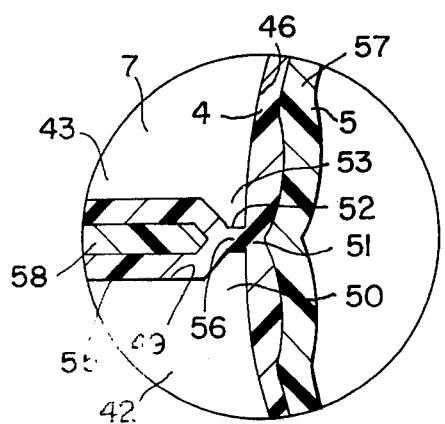
FIG_4_
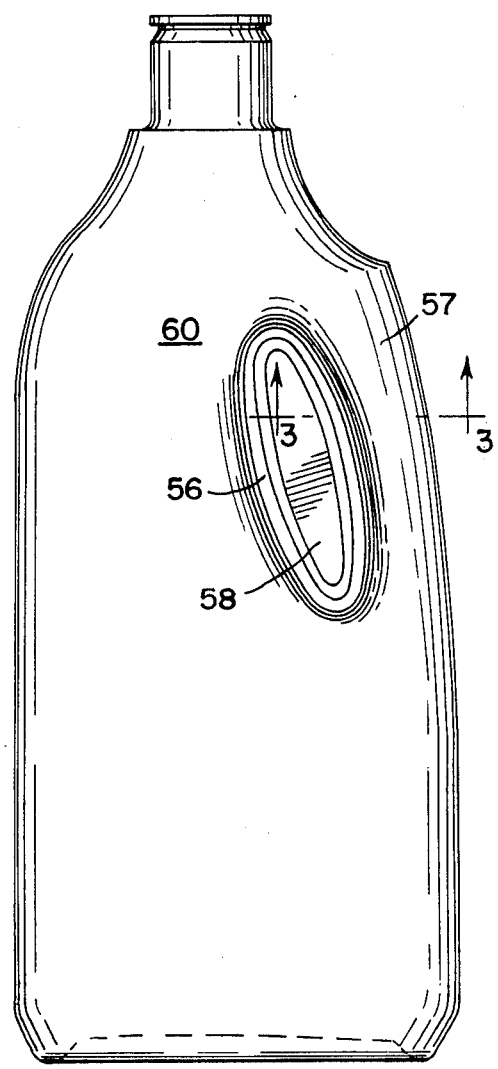
FIG_5_

3,892,828

METHOD OF MAKING PLASTIC ARTICLES HAVING EASILY SEVERABLE FLASH

DISCUSSION OF THE PRIOR ART

The art of making composite plastic containers is well known as disclosed in U.S. Pat. No. 2,936,489 wherein high pressure polyethylene is used to make the neck portion of a bottle and low pressure polyethylene is used to make the body portion.

Also the method of molding two-toned plastic articles formed of two plies of thermoplastic resin is known as disclosed in U.S. Pat. No. 3,057,016.

The production of multilayered laminates with different colors is also disclosed in U.S. Pat. Nos. 3,694,119; 3,513,060; and the production of multilayer iridescent plastic articles is disclosed in U.S. Pat. No. 3,576,707.

SUMMARY OF THE INVENTION

None of the art known to applicants combines lamina of thermoplastic resins which not only are fusible to each other to provide a unitary structure but which also are arranged that a coloring dye or pigment may be incorporated in a thin outer layer to minimize the quantity of pigment to be used and wherein the outer layer of resin is of relatively lower melting temperature than the inner layer and thus lessens the possibility of degrading the pigment, the deterioration of which is governed by time and temperature and which lessens plate out of the pigment on the die surfaces.

Furthermore, the instant arrangement of layers of plastic materials of different physical properties, wherein the inner layer which forms the body of the article is tough and strong and wherein the outer layer is substantially weaker and is positioned as an outer layer so that during closing of the dies, the material in the parting areas of the dies is pinched and the tougher material is squeezed out of the pinch zone leaving a thin web of the weak material which interconnects the finished article with the flash so that the flash may be easily snapped off having a clear smooth break without the necessity of cutting or grinding or otherwise removing such material connecting the flash with the article as has been a problem with previous structures.

A primary object of the invention is to provide a novel method of producing a plastic article which utilizes a laminate having a tough internal layer such as high density polyethylene or polypropylene and a weak easily snapped external layer such as low density polyethylene which in the molding process serves as a connection between the article and the flash to facilitate withdrawal of the article and flash from the mold, and which thereafter is easy to separate.

The invention contemplates coextruding a thin outer tube of low density polyethylene over a thick tube of high density polyethylene, the outer tube providing a glossy finish to the article and also serving as a vehicle for a coloring agent which may be mixed therein, the thin section of the tube minimizing the quantities of both the plastic material and the coloring agent used to provide a colored article.

A further object of the invention is to provide a novel composite parison wherein an outer layer is constituted of material processable at a relatively lower temperature than the inner layer of material which is adapted to constitute the body of the article, the outer layer of material incorporating a coloring agent which is less susceptible to plate out onto the mold surfaces into which it comes in contact.

A still further object is to provide an article such as a container formed of a laminate having an interior layer whose base resin has no inherent gloss and an external layer of low density polyethylene which may itself incorporate a coloring pigment or may cover a colored interior layer, the low density polyethylene imparting a glossy finish to the article.

These and other objects and advantages inherent in and encompassed by the invention will become more readily apparent from the specification and the drawings wherein:

FIG. 1 is a fragmentary longitudinal sectional view of typical molds and injection molding head showing the disposition and structure of the parison therein;

FIG. 2 is a cross-sectional view of one of the molds taken substantially along line 2—2 of FIG. 1 showing the distortion of the parison in the handle area of the article;

FIG. 3 is a further cross-section on line 3—3 of FIG. 5 showing the plastic parison pinched by the closed mold;

FIG. 4 is an enlarged segment of an encircled portion of the structure in FIG. 3; and FIG. 5 is a side elevational view of the article produced in the molds.

DESCRIPTION OF THE INVENTION

The apparatus 2 for blow molding may be essentially the structure disclosed in U.S. Pat. No. 2,515.093 issued to E. E. Mills on July 11, 1950.

In the present instance, however, an extruder head 3 is provided for coextruding an outer lamina or layer 4 and an inner lamina or layer 5 of a tubular parison 6.

The extruder head 3 is suitably mounted from associated machine framework or support structure (not shown) for delivery of the parison to the molds 7, 7 in a manner similar to that of the aforementioned Mills' patent. The extruder head in the instant disclosure comprises a die head 8 with a passage 10 therein wherein there is suitably mounted a slide stick 11 which is adapted to be axially adjusted by a motor 12 to which it is connected, the motor being governed by a programmer such as is well known in the art.

The slide stick 11 is connected to a core blank 13 which is fitted within a bore 14 provided within a shell insert or nozzle 15 which is secured as by bolts 16 to the body shell.

The bore 14 communicates with a coaxial body bore 18 within which is disposed a spreader 20 secured at its rear end 22 within an aperture 24 in a mounting ring 25 which is suitably bolted to the die head 8.

The rear portion of the bore 18 is provided with an annular chamber 26 which communicates with a passage 29 in the die head 8 into which the melted resin, preferably high density polyethylene, is force fed by an extruder screw or the like from a hopper as well known. The molten plastic in chamber 26 is maintained at processing temperature by heater strips 27, 28 wrapped about the shell body. The high density polyethylene layer emanating from chamber 26 is forced through the large cylindrical channel 27' defined between the internal surface 28' of the shell body and the external surface of the fusiform shaped spreader 20 and at the base 29 of the forward apical portion 30 of the spreader, the lamina 5 is coated by a veneer coating or layer 4 of low density polyethylene which may be mixed with a suitable color pigment. The coating layer is extruded under pressure from an annular chamber 33 formed in the shell body and die head block through a thin annular transaxial slot 34 which extends radially from the chamber 33 to the cylindrical channel 27'. The laminate 5 of parison, formed by the fused layers 4 and 5, is then forced toward the exit end 35 of the extruder along the tapered or frusto-conical portions 36, 37 of the opposing portions of the shell body and expander. In this region, the parison is contracted and flows into a cylindrical accumulator channel portion 37 of the extruder passageway, the portion 37 being of greater radial depth or thickness than the preceding portion of the passageway and being defined between a necked down surface 39 of the core blank and the cylindrical bore surface 14 of the shell insert.

Adjacent to the exit 35 the core blank gradually enlarges and is of frusto-conical shape which merges at its base end into a cylindrical rim edge 40 opposing the cylindrical bore surface 14.

As heretofore stated, the parison is introduced into the molds 7, 7, each mold having a stationary portion 42 and a translationally movable portion 43 which is moved between an open position (a partially open position being shown in FIG. 1) and a closed position shown in FIG. 3. As best seen in FIG. 3, the mold sections have a parting line or plane indicated X-X and in the present instance has a body forming cavity portion 45 and a handle forming cavity portion 46, the cavities being separated by opposing cores or hobs 47, 48 on the respective moold sections. The hob 47 has a flash-accommodating pocket 49 defined by an edge flange 50 which is provided with a pinch tooth 51 opposing a pinch tooth 52 on the hob 48 which also has an edge flange 53 defining a flash-accommodating pocket 54.

Thus upon the molds closing, after the parison to prevent collapse is partially inflated with several pounds of air blowing through the passage in the slide stick and core blank, the hobs advance toward each other and deform the parison as seen in FIGS. 1 and 2 and upon closing of the molds the parison is pinched by the teeth to an extent such that the high density, tough plastic material which is approximately .035 inches thick indicated in FIGS. 3 and 4 at 55 is squeezed out from the pinch area and only material left is the low density plastic approximately .005 to .015 inches which forms a weak connecting web at 56 between the container handle portion 57 and the flash 58 and between the flash and the body portion 60 of the container. After the mold is closed the parison is pierced by an air needle 61 through which high pressure air is introduced to blow the parison into conformance with the mold cavity.

In the present instance, flash is somewhat oval shaped as seen in FIG. 5 and is adapted to be easily snapped out by simple light pressure transversely thereof whereby the space occupied by the flash provides a hand accommodating aperture between the handle 57 and body 60 of the container. No sharp projections remained on the handle or body.

In actual practice it was noted that by adding the pigment to the thin skin lamina which in the present instance is a low density polyethylene, the lower processing (melting) temperature of this material which is between 370° and 380°F as compared to the processing (melting) temperature of (410°–430°F) of high density polyethylene constituting the inner layer was conducive to preservation of the pigment by reducing deterioration thereof which is a function of time and temperature. Furthermore, the lower processing temperature of the outer layer inhibited plate out of the pigment onto the cooled surfaces 63, 67 of the mold sections whereby the problem which is present with the higher melting inner layer material is essentially eliminated.

Furthermore, a substantially small quantity of pigment is required as compared to the amount that would be necessary to adequately color the body forming inner layer of material. In addition, if the containers were made or only the high density material, excessive amounts of pigment would have to be used, and the higher processing temperature of the material makes it more susceptible to pigment plate out having undesirable residual deposits on the mold surfaces, color variations would occur due to the higher processing temperature required and the plate out of the color. Also the container had a dull finish in contrast to a container made from the laminate of high density and low density materials.

Furthermore, when one layer of high density material is used, the flash is difficult to remove requiring that it be cut out or if forced out by tearing it would have sharp projections which had to be remelted or trimmed off.

In addition, the color of the container of the laminate can be highlighted by adding titanium oxides to the material constituting the body portion of the container with an overlap of the skin portion imparting the color.

Having disclosed a preferred embodiment of the invention, variations will now become apparent within the scope of the appended claims.

We claim:

1. A method of making a thermoplastic article having easily severable flash comprising the steps of coextruding into open mold sections a laminae of plastic in the form of a parison having a high density inner lamina and a low density external lamina, then closing the mold sections to enclose the parison and in closing the mold sections squeezing the laminae at the parting line of the mold sections to an extent sufficient to squeeze out the high density lamina at the parting line leaving thereat a thin easily severable weak web of low density lamina connecting the flash with the parison, and expanding the parison to form the article within the mold.

2. The invention according to claim 1 wherein said high density lamina is high density polyethylene and low density lamina is low polyethylene.

3. The invention according to claim 1 wherein said parison is formed as a tube and partially inflated after being introduced into the mold and said partially inflated tube is indented by portions of the mold and then pinched to squeeze out the high density lamina.

4. In a method of making a plastic container formed of an expansible laminae of material having an inner core of high density and a material of low density forming an outer sheath integral with the inner core, the steps of introducing the laminae into open mold, sections then while in a plastic state, closing the mold sections against the laminae at a pressure sufficient to exude the high density material from between sections of the mold at the parting line thereof and leaving a web of said low density material therebetween and thereby forming an easily severable connection between the flash and the container formed upon subsequent expansion of said laminae within the mold.

5. The method according to claim 4 and said material of high density comprising a high density polyethylene and the material of low density comprising a low density polyethylene.

6. The invention according to claim 4 and dispersing a pigment between said core and sheath.

7. The invention according to claim 4 and introducing an opague pigment into the core material prior to said step of introducing.

8. A method of making an article from a laminate comprising an inner layer of thermoplastic material and an outer layer of material different than the inner layer and comprised of low density polyethylene comprising introducing such laminate into article forming mold sections having a configuration wherein islands of flash are developed, then closing the mold sections an extent sufficient to pinch the material and squeeze out the inner layer of material from between the parting areas of the mold sections leaving only an easily severable material to form a web interconnecting the islands of flash with the article, and then expanding the laminate into said article within the mold formed by said sections when closed.

9. The invention according to claim 8 wherein the inner layer of material is polypropylene.

* * * * *